(12) United States Patent
Tsai et al.

(10) Patent No.: US 7,810,961 B2
(45) Date of Patent: Oct. 12, 2010

(54) ENERGY-SAVING LIGHT-EMITTING MODULE

(75) Inventors: Ching Cheng Tsai, Taipei Hsien (TW); Chia Hsin Chen, Taipei Hsien (TW)

(73) Assignee: Chicony Electronics Co., Ltd., Taipei Hsien (TW)

( * ) Notice: Subject to any disclaimer, the term of this patent is extended or adjusted under 35 U.S.C. 154(b) by 68 days.

(21) Appl. No.: 12/010,461

(22) Filed: Jan. 25, 2008

(65) Prior Publication Data

US 2009/0122558 A1 May 14, 2009

(30) Foreign Application Priority Data

Nov. 8, 2007 (TW) .............................. 96142196 A

(51) Int. Cl.
*G02B 6/10* (2006.01)
(52) U.S. Cl. ...................... 362/310; 362/314; 362/602; 362/619
(58) Field of Classification Search ................. 362/310, 362/314, 600–632
See application file for complete search history.

(56) References Cited

U.S. PATENT DOCUMENTS

| | | | | |
|---|---|---|---|---|
| 5,584,556 | A | * | 12/1996 | Yokoyama et al. .......... 362/625 |
| 5,921,651 | A | * | 7/1999 | Ishikawa ..................... 362/624 |
| 6,074,069 | A | * | 6/2000 | Chao-Ching et al. .......... 362/26 |
| 7,156,548 | B2 | * | 1/2007 | Teng et al. ................... 362/625 |
| 7,239,303 | B2 | * | 7/2007 | Liao et al. ................... 345/168 |
| 7,322,733 | B2 | * | 1/2008 | Chang et al. ................ 362/617 |
| 7,351,928 | B2 | * | 4/2008 | Harada .................... 200/302.1 |
| 7,388,167 | B2 | * | 6/2008 | Liao et al. ................... 200/310 |
| 7,525,056 | B2 | * | 4/2009 | Chiba et al. ................. 200/314 |
| 7,527,416 | B2 | * | 5/2009 | Lin ............................ 362/626 |
| 2006/0146572 | A1 | * | 7/2006 | Yang et al. .................. 362/615 |

* cited by examiner

*Primary Examiner*—Anabel M Ton
(74) *Attorney, Agent, or Firm*—Bacon & Thomas, PLLC

(57) ABSTRACT

An energy-saving light-emitting module is provided, comprising: a light guide plate having a light-incident surface, a bottom surface intersecting the light-incident surface and a light-emitting surface opposite the bottom surface, wherein a plurality of recesses are provided at the bottom surface; a light source placed at one side of the light-incident surface of the light guide plate; and a reflective plate placed at the bottom of the light guide plate for reflecting light rays from the light source into the light guide plate. The light rays emitted by the light source reach the arc surface of each recess at the bottom side of the light guide plate, and the light rays are then reflected to the light-emitting surface. Meanwhile, during the light-emitting process, light rays are concentrated at the arc surface of each recess. The concentration of light rays increases overall luminance produced by the module, and thus, energy is saved effectively.

14 Claims, 3 Drawing Sheets

ENERGY-SAVING LIGHT-EMITTING MODULE

BACKGROUND OF THE INVENTION

1. Field of the Invention

This invention relates generally to a light-emitting module, and more particularly, to a light-emitting module that emits light with equal luminance and saves energy.

2. Description of the Related Art

With the rapid development of modern technology, portable electronic appliances, such as mobile phones, personal digital assistants (PDAs) and notebook computers, have become more and more popular. These electronic appliances are generally provided with a keyboard construction, by which a user could input data or send instructions for the electronic appliance to run different programs. Moreover, in order to allow the user normal operations on the keys of the keyboard construction in dark surroundings, a light guide plate and a light source are typically configured within the keyboard module to illuminate the keys. The light guide plate reflects light rays coming from the light source, and as a result, the keys are illuminated. The user could then easily identify the position of each key and the symbol or number displayed on it; the user could press the keys to operate the electronic appliance even in dark surroundings.

Typically, the light source described above uses a light emitting diode (LED) light. The LED lights are distributed among the keys, and through the light guide plate, the light rays emitted by the LED lights are directed toward the symbols on the keys. To ensure that every key on the keyboard emits light with equal luminance, the amounts of LED lights may vary depending on the design of the keyboard. Usually, a computer keyboard requires at least six LED lights configured for the keyboard construction. Such configuration not only increases the manufacture cost, but also consumes more electricity or energy of the entire keyboard construction. In addition, distributing LED lights among the keys, in practice, is disadvantageous in that emitted light rays may have different luminances. This happens because the light rays emitted by an LED light fades gradually as the distance between the LED light and the key increases. When the LED light is lit up, it is clearly seen that the keys nearer the LED light are brighter, while the farther keys are not so bright. Although such configuration of light sources illuminates the keyboard, the light rays are not emitted with equal luminance, which may affect the user's visual perception.

For the related industries, it is therefore desirable to provide a light-emitting device for the keyboard construction that saves cost and energy and emits light with equal luminance.

SUMMARY OF THE INVENTION

It is an object of the invention to provide an energy-saving light-emitting module which emits light with equal luminance.

It is another object of the invention to provide an energy-saving light-emitting module which concentrates light rays coming from a light source, increases overall luminance, and saves energy.

It is another object of the invention to provide a keyboard construction which emits light with equal luminance.

It is yet another object of the invention to provide a keyboard construction which concentrates light rays coming from a light source, increases overall luminance, and saves energy.

To achieve the above objects of the present invention, an energy-saving light-emitting module is provided, comprising: a light guide plate having a light-incident surface, a bottom surface intersecting the light-incident surface and a light-emitting surface opposite the bottom surface, wherein a plurality of recesses are provided at the bottom surface; a light source placed at one side of the light-incident surface of the light guide plate; and a reflective plate placed at the bottom of the light guide plate for reflecting light rays from the light source into the light guide plate.

The recesses of the light guide plate are arranged in a rising manner like stairs.

Among the recesses of the light guide plate, the recess nearer the light source has a lower height and the recess farther from the light source has a greater height.

Each recess is hemisphere-shaped.

Each recess is of any geometric shape.

The light source is a light emitting diode (LED) or any light-emitting component.

To achieve the above objects of the present invention, a keyboard construction for the electronic appliance is provided, comprising: a plurality of keys and an energy-saving light-emitting module characterized in that: the energy-saving light-emitting module being disposed under the plurality of keys and having: a light guide plate having a light-incident surface, a bottom surface intersecting the light-incident surface and a light-emitting surface opposite the bottom surface, wherein a plurality of recesses are provided at the bottom surface; a light source placed at one side of the light-incident surface of the light guide plate; and a reflective plate placed at the bottom of the light guide plate for reflecting light rays from the light source into the light guide plate.

The keyboard construction for the electronic appliance is a keyboard construction for a computer, mobile phone, PDA, portable media player, or any electronic appliance comprising a keyboard.

The recesses of the light guide plate are arranged in a rising manner like stairs.

Among the recesses of the light guide plate, the recess nearer the light source has a lower height and the recess farther from the light source has a greater height.

Each recess is hemisphere-shaped.

Each recess is of any geometric shape.

The light source is a light emitting diode (LED) or any light-emitting component.

During the light-emitting process of the module according to the present invention, light rays coming from the light source are concentrated at the arc surface of each recess. This concentration of light rays increases overall luminance produced by the module, and thus, energy is saved effectively. Moreover, since the recesses of the light guide plate are arranged in a stair-like manner, the arc surface of each recess could receive the light rays in an equal amount. The light rays are then reflected and guided toward the light-emitting surface, where the light rays are emitted with equal luminance.

DETAILED DESCRIPTION OF THE PREFERRED EMBODIMENT

Figure 1:
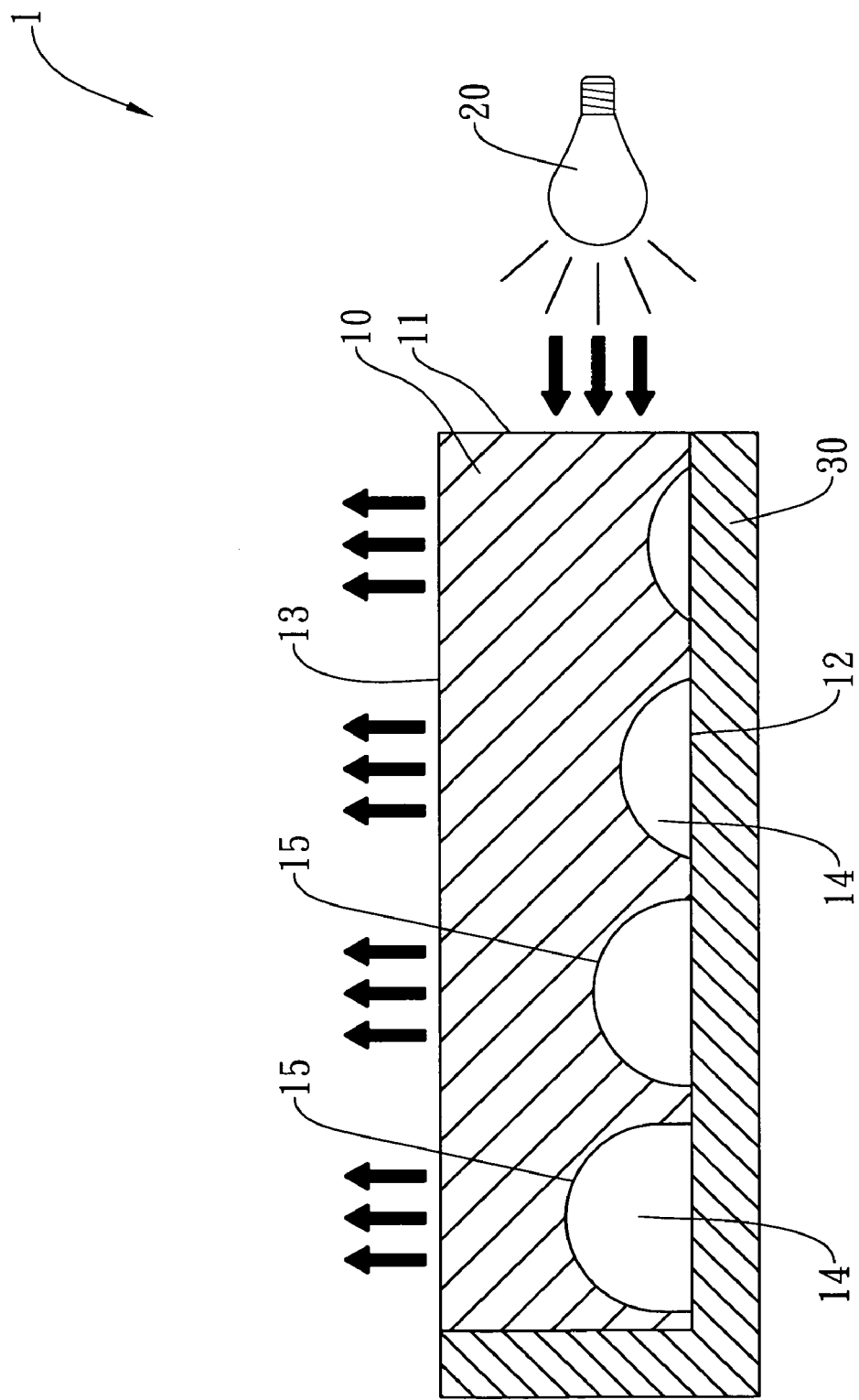
FIG. 1 shows a side sectional view of an energy-saving light-emitting module of this invention.

With reference to FIG. 1, a side sectional view of an energy-saving light-emitting module of this invention is shown. An energy-saving light-emitting module 1 comprises: a light guide plate 10 having a light-incident surface 11, a bottom surface 12 intersecting the light-incident surface 11 and a light-emitting surface 13 opposite the bottom surface 12, wherein a plurality of recesses 14 are provided at the bottom surface 12; a light source 20 placed at one side of the light-incident surface 11 of the light guide plate 10; and a reflective plate 30 placed at the bottom side and another flank side of the light guide plate 10, for reflecting light rays coming from the light source.

Each recess 14 of the light guide plate 10 has an arc surface 15. The recesses 14 are arranged in a stair-like manner in accordance with the proximity of each recess to the light source 20. The recess 14 nearer the light source 20 has a lower height, and the recess 14 farther from the light source 20 has a greater height. As a result, each arc 15 of the recess 14 of the light guide plate 10 could receive light rays in an equal amount, enabling the light rays to be emitted by the module with equal luminance. In one embodiment of the present invention, the recess 14 of the light guide plate 10 is hemisphere-shaped. Alternatively, the recess 14 of the light guide plate 10 can be of any geometric shape as known in the art; description and drawings are not to be further illustrated herein.

The energy-saving light-emitting module 1 is provided with the light source 20, which emits light rays that enter the light guide plate 10 through the light-incident surface 11. As the light rays from the light source 20 reach the arc surface 15 of each recess 14 at the bottom surface 12, the light rays are reflected by the reflective plate 30 to proceed toward the light-emitting surface 13. At the same time, the light rays are concentrated at the arc surface 15 of each recess 14. The concentration of light rays increases the overall luminance, and thus, energy can be saved effectively. In addition, the configuration of the reflective plate 30 prevents the light rays coming from the light source 20 from leaking out of the light guide plate 10. The light guide plate 10, filled with the light rays from the light source 20, preserves sufficient light for emission later. Also, since the recesses 14 are arranged in a stair-like manner, the arc surface 15 of each recess 14 could receive the light rays in an equal amount. When the light rays reaching the arc surface 15 are reflected and guided toward the light-emitting surface 13, they can be emitted by the module 1 with equal luminance.

Figure 2:
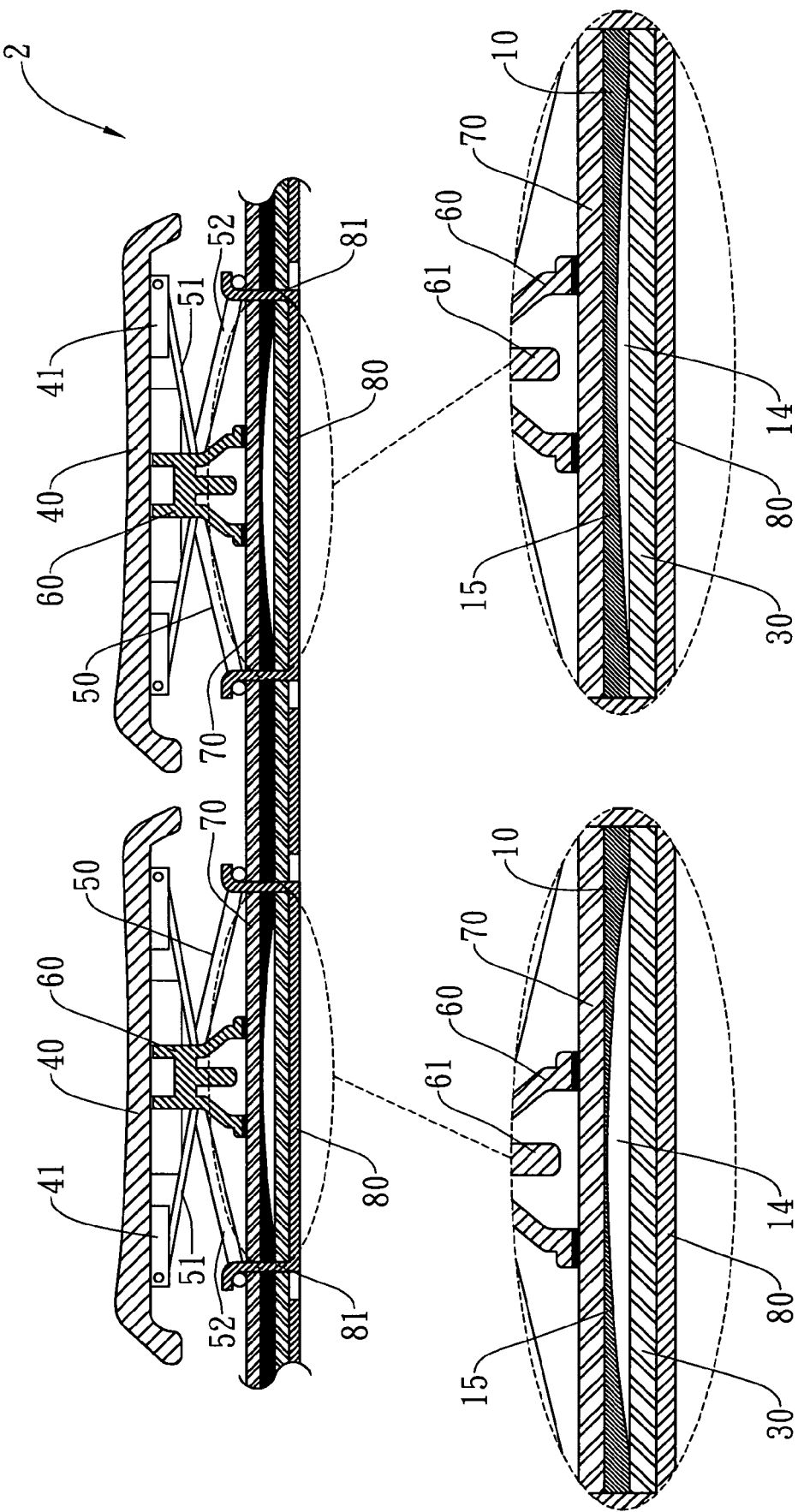
FIG. 2 shows an enlarged partial side sectional view of a computer keyboard applying the energy-saving light-emitting module of this invention.

With reference to FIG. 2, an enlarged partial side sectional view of a keyboard construction 2 for the electronic appliance applying the energy-saving light-emitting module 1 of this invention is shown. In the illustrated embodiment, the keyboard construction 2 is a computer keyboard. It is to be noted that the light source 20 is not shown in the illustration, and that only two keys are shown here, while the rest of the keys of the keyboard construction 2 may be derived from the example. The keyboard construction 2 comprises: a plurality of keycaps 40, with a pair of top retaining portions 41 being provided at both sides under each keycap 40; a plurality of scissors-like linkages 50, with each scissors-like linkage 50 having a pair of top hinge portions 51 and a pair of bottom hinge portions 52; a plurality of resilient contact members 60, with each resilient contact member 60 having a contact end 61; a membrane circuit board 70 consisting of top, middle and bottom circuit layers; a base 80 provided with a plurality of bottom retaining portions 81 corresponding to the top retaining portions 41; and a plurality of energy-saving light-emitting modules 1 disposed between the membrane circuit board 70 and the base 80. The assembly of the keyboard construction is by first securing the top hinge portions 51 of the scissors-like linkage 50 to the top retaining portions 41 under each keycap 40. Next, the resilient contact member 60 is fixed on the membrane circuit board 70 by glue, between the keycap 40 and the membrane circuit board 70. Then, the bottom retaining portions 81 of the base 80 snap and fasten the bottom hinge portions 52 of the scissors-like linkage 50 by piercing through the membrane circuit board 70 and the energy-saving light-emitting module 1.

Figure 3:
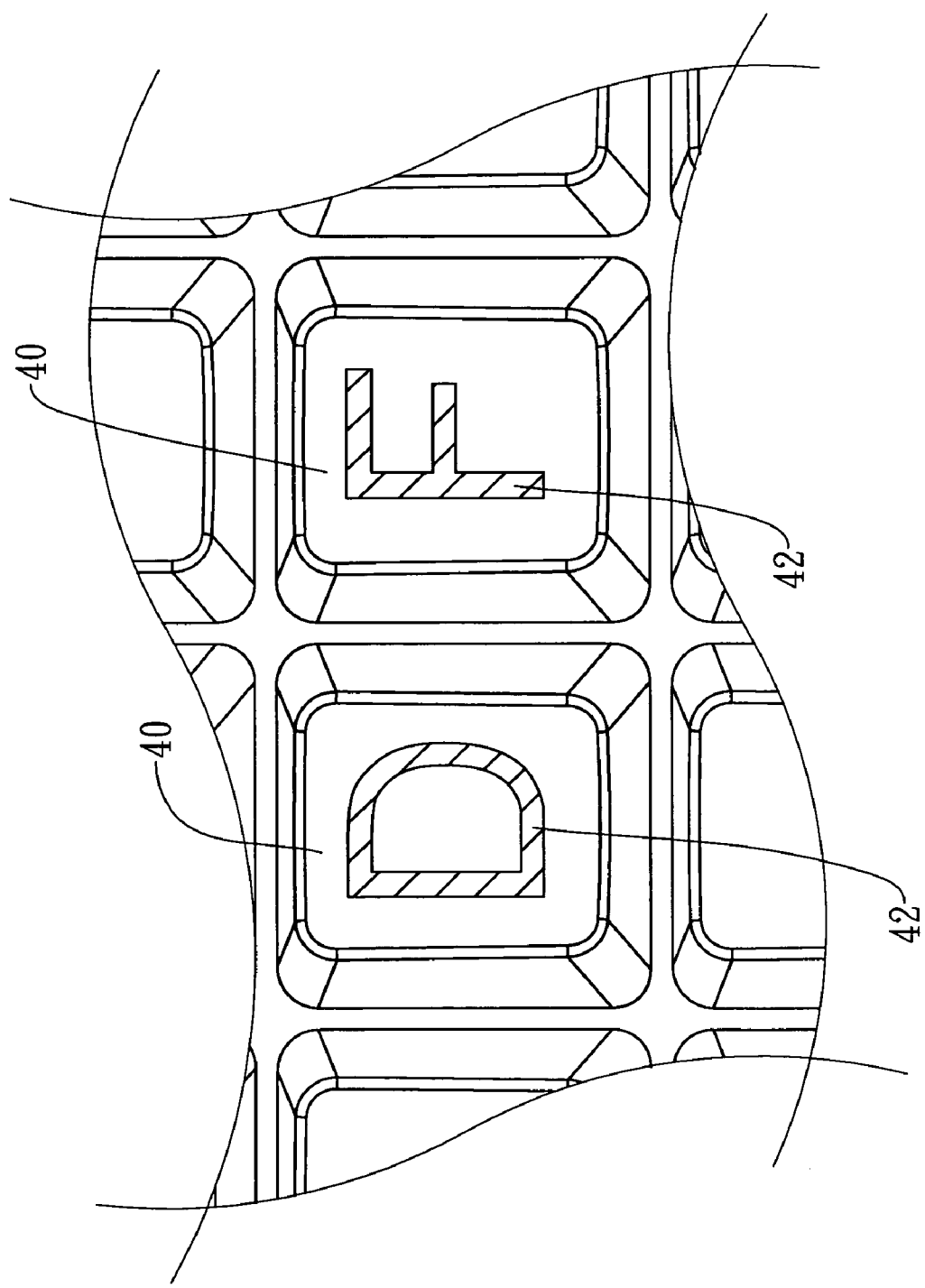
FIG. 3 is a partial enlarged top view of the keyboard as shown in FIG. 2.

FIG. 3 shows a partial enlarged top view of a keyboard construction 2 for the electronic appliance applying the energy-saving light-emitting module 1 of the present invention. The illustrated embodiment takes a computer keyboard for example of the keyboard construction 2, and only two keys of the keyboard are shown in the illustration. Each keycap 40 of the keyboard is provided with a corresponding symbol 42 on it. Each symbol 42 is engraved on the keycap 40 to present a translucent effect. In the illustrated embodiment, a "D" key and an "F" key are taken as example for explanation. With reference to FIGS. 2 and 3, it is known that each symbol is translucent for being engraved on the keycap. It is also known that of the two recesses 14 at the light guide plate under the D and F keys, one recess 14 has a greater height than the other recess 14 since the arc surfaces 15 of the recesses 14 are arranged in a stair-like manner. The light source 20 is placed at one side of the F key, and light rays transmit in a direction from F key to D key. The light source 20 emits light rays to the light-incident surface 11 of the light guide plate 10. The light rays then reach each arc surface 15 of the recess 14 at the bottom side 12 of the light guide plate and are reflected by the reflective plate 30. The reflected light rays then proceed toward the light-emitting surface 13 and pass through the membrane circuit board 70 made of transparent or translucent materials. The light rays are finally emitted out of the D and F keys with the engraved translucent symbols 42 on them. The keys are thus illuminated with equal luminance. During the light-emitting process, the light rays coming from the light source 20 are concentrated at the arc surface 15 of each recess 14 at the bottom surface 12 of the light guide plate. This concentration of light rays increases overall luminance produced by the module, and thus, energy is saved effectively. Moreover, since the recesses 14 of the light guide plate 10 are arranged in a stair-like manner, the arc surface 15 of each recess 14 could receive the light rays in an equal amount. Therefore, the light rays could be emitted out of the keys with the engraved translucent symbols 42 on them in an equal amount.

In other embodiments of the present invention, the keyboard construction for the electronic appliance may be a keyboard construction for a mobile phone, PDA, portable media player, or any electronic appliance comprising a keyboard. Moreover, the light source may be of any color, and may be an LED or any light-emitting component.

During the light-emitting process of the module according to the present invention, light rays coming from the light source are concentrated at the arc surface of each recess. This concentration of light rays increases overall luminance produced by the module, and thus, energy is saved effectively. Moreover, since the recesses of the light guide plate are arranged in a stair-like manner, the arc surface of each recess could receive the light rays in an equal amount. The light rays are then reflected and guided toward the light-emitting surface, where the light rays are emitted with equal luminance.

What is claimed is:

1. A keyboard construction for an electronic appliance comprising a plurality of keys and an energy-saving light-emitting module, comprising:

the energy-saving light-emitting module disposed under the plurality of keys and having:

a light guide plate having a light-incident surface, a bottom surface intersecting the light-incident surface and a light-emitting surface opposite the bottom surface, wherein a plurality of recesses are provided at the bottom surface;

a light source placed at one side of the light-incident surface of the light guide plate; and a reflective plate placed at the bottom of the light guide plate for reflecting light rays from the light source into the light guide plate;

wherein the recesses of the light guide plate are arranged in a rising manner like stairs, and the recess nearest the light source has a lower height and the recess farthest from the light source has a greater height.

2. The keyboard construction for the electronic appliance of claim 1, wherein the keyboard construction is for a computer, mobile phone, PDA, portable media player, or any electronic appliance comprising a keyboard.

3. The keyboard construction for the electronic appliance of claim 1, wherein each recess is hemisphere-shaped.

4. The keyboard construction for the electronic appliance of claim 2, wherein each recess is of any geometric shape.

5. The keyboard construction for the electronic appliance of claim 1, wherein the light source is a light emitting diode (LED) or any light-emitting component.

6. A computer keyboard, comprising: a plurality of keycaps, scissors-like linkages, resilient contact members, a membrane circuit board, a base and a plurality of energy-saving light-emitting modules, and including:

each energy-saving light-emitting module being disposed between the membrane circuit board and the base, and comprising:

a light guide plate having a light-incident surface, a bottom surface intersecting the light-incident surface and a light-emitting surface opposite the bottom surface, wherein a plurality of recesses are provided at the bottom surface;

a light source placed at one side of the light-incident surface of the light guide plate; and a reflective plate placed at the bottom of the light guide plate for reflecting light rays from the light source into the light guide plate;

wherein the recesses of the light guide plate are arranged in a rising manner like stairs, and the recess nearest the light source has a lower height and the recess farthest from the light source has a greater height.

7. The computer keyboard of claim 6, wherein each keycap is provided with a corresponding symbol which is engraved to present a translucent effect.

8. The computer keyboard of claim 6, wherein each recess is hemisphere-shaped.

9. The computer keyboard of claim 6, wherein each recess is of any geometric shape.

10. The computer keyboard of claim 6, wherein the light source is a light emitting diode (LED) or any light-emitting component.

11. The keyboard construction for the electronic appliance of claim 1, wherein the reflective plate placed at the bottom side of the light guide plate includes a flank side of the light guide plate.

12. The computer keyboard of claim 6, wherein the reflective plate placed at the bottom side of the light guide plate includes a flank side of the light guide plate.

13. The keyboard construction for the electronic appliance of claim 3, wherein each recess has an arc and each arc receives light rays in an equal amount.

14. The computer keyboard of claim 8, wherein each recess has an arc and each arc receives light rays in an equal amount.

* * * * *